US 8,774,500 B2

(12) United States Patent
Simske et al.

(10) Patent No.: US 8,774,500 B2
(45) Date of Patent: Jul. 8, 2014

(54) PRINTED INFORMATION DEVICE

(75) Inventors: Steven J. Simske, Fort Collins, CO (US); Malgorzata M. Sturgill, Fort Collins, CO (US); Jason S. Aronoff, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/384,911

(22) PCT Filed: Nov. 25, 2009

(86) PCT No.: PCT/US2009/065965
§ 371 (c)(1),
(2), (4) Date: Jan. 19, 2012

(87) PCT Pub. No.: WO2011/065947
PCT Pub. Date: Jun. 3, 2011

(65) Prior Publication Data
US 2012/0269427 A1  Oct. 25, 2012

(51) Int. Cl.
*G06K 9/00* (2006.01)
(52) U.S. Cl.
USPC .......................................................... 382/162
(58) Field of Classification Search
None
See application file for complete search history.

(56) References Cited

U.S. PATENT DOCUMENTS

| | | | |
|---|---|---|---|
| 4,803,570 A * | 2/1989 | Kashida et al. ................. 360/61 |
| 5,369,261 A * | 11/1994 | Shamir .......................... 235/469 |
| 6,341,016 B1 * | 1/2002 | Malione ......................... 356/603 |
| 6,882,712 B1 | 4/2005 | Iggulden et al. |
| 7,020,327 B2 | 3/2006 | Tack-don et al. |
| 7,118,041 B2 | 10/2006 | Taylor |
| 7,180,524 B1 * | 2/2007 | Axelrod ......................... 345/593 |
| 7,210,631 B2 * | 5/2007 | Sali et al ................... 235/462.04 |
| 2002/0028015 A1 * | 3/2002 | Tack-don et al. ............ 382/162 |
| 2003/0035564 A1 | 2/2003 | Honsinger et al. |
| 2003/0118183 A1 * | 6/2003 | Struyk .......................... 380/213 |
| 2003/0128375 A1 | 7/2003 | Ruhl et al. |
| 2006/0097062 A1 * | 5/2006 | Cheong et al. ................ 235/494 |
| 2006/0098245 A1 | 5/2006 | Park |
| 2006/0171559 A1 | 8/2006 | Rhoads |
| 2006/0233257 A1 * | 10/2006 | Keith et al. ............... 375/240.19 |
| 2007/0295814 A1 * | 12/2007 | Tanaka et al. ................ 235/454 |
| 2008/0000991 A1 * | 1/2008 | Yin et al. ...................... 235/494 |
| 2008/0043273 A1 * | 2/2008 | Simske et al. ............... 358/1.14 |
| 2008/0052529 A1 | 2/2008 | Simske et al. |
| 2009/0016647 A1 * | 1/2009 | Hamaguchi ................... 382/305 |
| 2009/0166418 A1 * | 7/2009 | Onoda et al. ................. 235/435 |
| 2009/0242650 A1 * | 10/2009 | Ushijima et al. ............. 235/494 |
| 2009/0314838 A1 * | 12/2009 | Kimura et al. ................ 235/469 |
| 2010/0282856 A1 * | 11/2010 | Bulan et al. .................. 235/494 |

OTHER PUBLICATIONS

Bulan et al., "High capacity color barcodes using dot orientation and color separability", Proc. SPIE 7254, Media Forensics and Security, 725417 (Feb. 4, 2009).*
Parikh et al., "Localization and Segmentation of a 2D High Capacity Color Barcode," 2008 IEEE Workshop on Applications of Computer Vision (WACV 2008), pp. 1-6, Jan. 7-9, 2008.*
International Search Report and Written Opinion for PCT/US2009/065965 dated Aug. 2, 2010 (12 pages).

* cited by examiner

*Primary Examiner* — Bhavesh Mehta
*Assistant Examiner* — Feng Niu

(57) ABSTRACT

A printed information device includes a region of interest in an image, and at least two channels assigned to the region of interest by different means of logical partitioning. The region of interest represents a physical area of the image. Each of the channels has a different error tolerance. Continuous and/or cyclic information is independently encoded in each of the at least two channels. The deterrent is configured to be read substantially simultaneously by at least two distinct reading strategies.

19 Claims, 2 Drawing Sheets

PRINTED INFORMATION DEVICE

BACKGROUND

The present disclosure relates generally to printed information devices.

Product labeling and security packaging are important components of brand protection, product tracking and authenticating, as well as of anti-counterfeiting initiatives. Product labeling and security packaging involve providing each package with a unique ID, in the form of, for example, a deterrent or mark. Such deterrents/marks may be overt and/or covert, and contain authenticable data. Authentication is the process of determining whether a product associated with a deterrent actually originates from a putative party, such as the company that manufactures or sells the product. Authentication enables one to verify, throughout the distribution or supply chain, that the product actually originates from the company that made or sold such product. Authentication is also designed to deter counterfeiters from making and/or selling counterfeit products.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Embodiments of the printed information device disclosed herein include an image that includes a plurality of physical areas. Such areas are represented as regions of interest, each of which may include multiple channels. Each channel may be independently encoded with its own data-carrying strategy. As such, a single physical area or region of interest in a deterrent simultaneously encodes two or more distinct reading strategies. This advantageously enables the printed information device to be read via multiple distinct strategies simultaneously.

Figure 1:
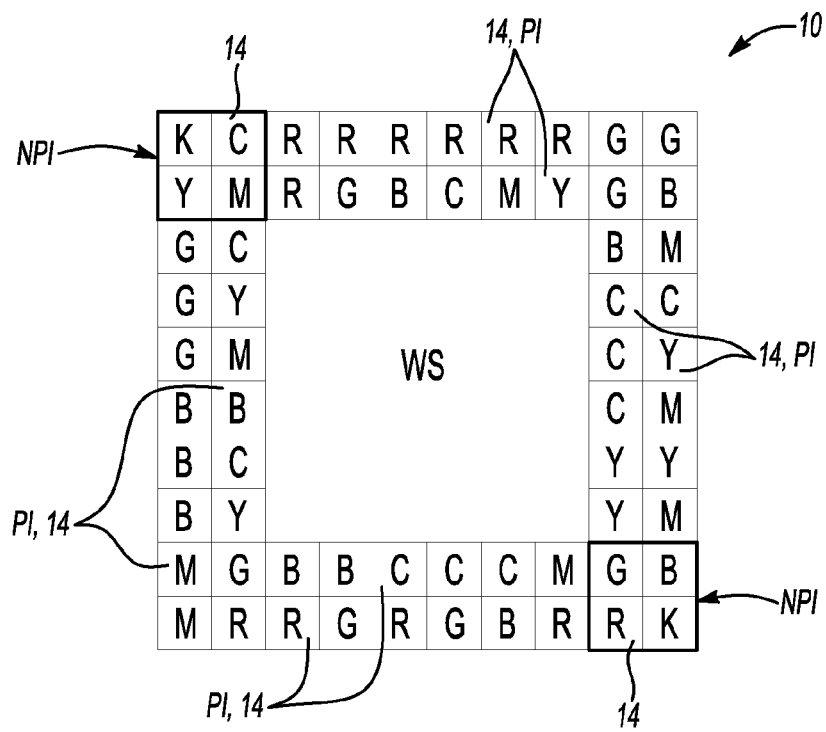
FIG. 1 is a schematic view of a color-based tile (or barcode) printed information device.

Referring now to FIG. 1, an embodiment of the printed information device 10 is depicted. The printed information device 10 includes one or more regions of interest 14, which are representative of respective physical areas of an image used to form the printed information device 10. The regions of interest 14 are selected from color tiles (as shown in FIG. 1), color lines, and/or color text. In one embodiment, the printed information device 10 may also include white space WS that is incorporated between, around, and/or in the center of a plurality of the physical areas. It is to be understood that the printed information device 10 may be a security device/deterrent or a non-security device.

The physical areas (regions of interest) 14 are either payload indicia (PI) or non-payload indicia (NPI). Payload indicia PI are those regions of interest 14 that carry data, and non-payload indicia NPI are those regions of interest 14 that do not carry data, but rather are used for color, orientation and skew calibration. The regions of interest 14 that are used for payload indicia PI or non-payload indicia NPI may vary from printed information device 10 to printed information device 10. The non-limiting example of the printed information device 10 shown in FIG. 1 includes 56 payload indicia PI and 8 non-payload indicia (KCYM in upper left corner and GBRK in lower right corner) areas 14.

The regions of interest 14 may be assigned two or more data channels by means of logical partitioning. In one embodiment, such partitioning is based upon a desired error tolerance or 100% accuracy at different printed sizes. Logical partitioning provides two or more data channels which allow errors of different rates for different imaging devices. The information encoded in one channel may be readable with one imaging device, while the information encoded in another channel may be readable with another imaging device. As such, different data densities may be read depending upon which channel is successfully read.

Generally, a printed information device 10 which contains color uses a multiplicity, M, of hues to provide $\ln(M)/\ln(2)$ bits of information per payload indicia PI. Each different hue is representative of an event in the printed information device 10. An "event" is one possible outcome from a set of possible outcomes that can be read by a reading device. A specific hue, e.g., R, is an event from the set {RGBCMY}. A specific shape, e.g., "circle", from the set {circle, square, rhombus, triangle} is an event. A specific orientation, e.g., "-", from the set {|/-\} is an event. Generally, when color is utilized, at least 6 different hues are used in forming the printed information device 10. However, any number of hues may be used, and in one embodiment, the number of hues may be as high as $256^3$ for an 8-bit/channel red-green-blue (R-G-B) image. As non-limiting examples, for printed information devices 10 including 6 events or hues, generally two channels are assigned; for printed information devices 10 including 10 or more events or hues, up to three channels may be assigned; and for printed information devices 10 including 14 or more events or hues, up to four channels may be assigned.

The channels of the region of interest 14 are each associated with a data reading strategy, which depends, at least in part, upon the desired tolerance for the respective channels. The data reading strategies may, in some instances, be associated with hues. For example, one channel may be associated with a 2 hue data reading strategy (i.e., set size=2) and another channel may be associated with a 6 hue data reading strategy (i.e., set size=6).

Hue or other information is independently encoded in the channels based on and corresponding with the data reading capability/strategy. Information that may be encoded in the variety of channels may be continuous in wavelength and/or cyclical or periodic in a representative space (i.e., a 3D model fits to a single continuum, such as, for example, with a full saturation hue-based circular color space). Hue is one form of continuous and cyclic information. Other cyclic information that may be encoded includes shapes (e.g., moving from circular to elliptical to triangular to rectangular to rhomboidal to trapezoidal to hexagonal to octagonal and back to circular) and/or orientation (e.g., | \-/) of a glyph or feature printed with the printed information device 10.

Each channel also has a different error tolerance, and in some instances, error type. As one non-limiting example, when 6 total hues are used in a printed information device 10, a 2 hue data reading strategy has a 90° or greater error tolerance associated therewith, while a 6 hue data reading strategy has a 30° or greater error tolerance associated therewith. As another non-limiting example, when 8 total hues are used in a printed information device 10, a 2 hue data reading strategy has a 67.5° or greater error tolerance associated therewith, while an 8 hue data reading strategy has a 22.5° or greater error tolerance associated therewith. In still another non-limiting example, when 10 total hues are used in a printed information device 10, a 2 hue data reading strategy has a 54° or greater error tolerance associated therewith, while a 10 hue data reading strategy has an 18° or greater error tolerance associated therewith. "Error tolerance", as used herein, generally refers to the degree of deviation that is allowed to occur before an actual error is reported.

One or more of the respective channels within a single region of interest 14 can have its own error-correcting code (ECC) encoded therein as part of the bit stream of the channel. The error-correcting code used will depend, at least in part, on the total number of events in the printed information device 10 and the error tolerance associated with the channel. Different error-correcting code strategies may be used, and a desirable error-correcting code may be selected based upon which channel and corresponding reading device is to be utilized downstream. Such strategies may or may not include additional error correcting code encoded in the channel depending upon the desired read strategy (i.e., which reading device(s) will support such strategies). In one embodiment, error correcting code is targeted for one channel, and the second channel is automatically readable as a result.

The security payload density of each channel may also be different, depending, at least in part, upon the data reading strategy associated with the channel. Payload density is generally measured in bytes/inch$^2$, and thus describes the amount of information for a given area that is embedded in the printed information device 10. Generally, a higher payload density is more desirable. In some instances, a lower value of the data reading strategy (e.g., a 2 hue-based strategy) can actually increase the payload density of that particular channel of the region of interest 14. Since multiple channels are utilized in the embodiments disclosed herein, the payload density of individual channels and the overall region of interest 14 may be enhanced.

Spectral pre-compensation methods may be performed on the regions of interest 14, depending, at least in part, on the data reading strategies that are utilized. Spectral pre-compensation may, in some instances, improve the payload density of the channel. Such methods involve printing an appropriate set of target hues, scanning them and selecting the hues from this set that, after printing and scanning, result in the intended hue set (e.g., a six hue set of RGBCMY). The selected hues are then used as a replacement for the original RGBCMY set, and the security 10 is printed using such replacement hues. As non-limiting examples, blue (B) may be pre-compensated by adding magenta (M), M may be pre-compensated by adding B, cyan (C) may be pre-compensated by adding green (G), and G and red (R) may be respectively pre-compensated by adding yellow (Y). Such spectral pre-compensation methods force the printed hues (e.g., RGBCMY) to be as close as possible to 60° (or another degree depending upon the number of hues used) apart after the first print-scan cycle.

Spectral pre-compensation methods may be particularly desirable, for example, when a 6 hue data reading strategy is utilized in the region of interest 14. Generally, after each copy cycle (e.g., print and scan cycle), the payload density of the original region of interest 14 decreases. Lessening this already occurring reduction in payload density would be desirable. Spectral pre-compensation methods introduced to regions of interest 14 incorporating a 6 hue data reading strategy generally helps to decrease the loss in payload density after one or more copy cycles. In contrast, spectral pre-compensation method may be undesirable when a 2 hue data reading strategy is utilized in the region of interest 14. Spectral pre-compensation methods introduced to regions of interest 14 incorporating a 2 hue data reading strategy generally aids in further increasing the loss in payload density after one or more copy cycles. Since this additional loss in density is generally undesirable after copying, spectral pre-compensation methods may not be used for the 2 hue data reading strategy. It is to be understood that spectral pre-compensation methods may be incorporated with any data reading strategy, and may depend upon the effect such method has on the payload density after one or more copy cycles.

Figure 4:
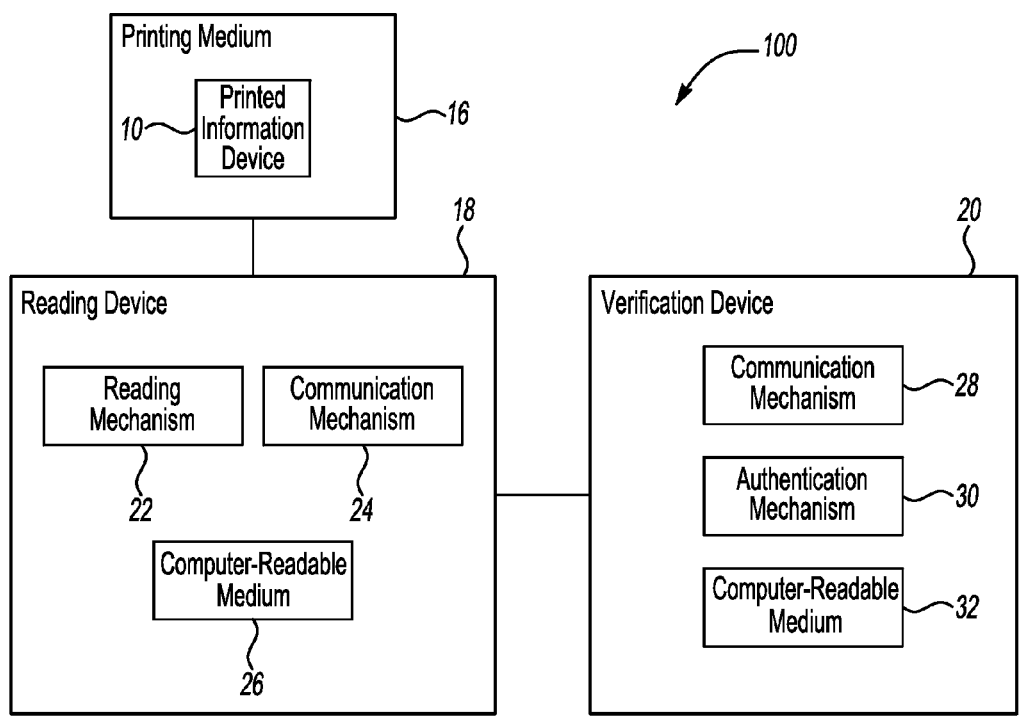
FIG. 4 is a schematic diagram of an embodiment of a system for verifying whether the accuracy of a reading of an embodiment of the printed information device is within a tolerance of the reading device used.

Once the desirable channels are partitioned and encoded, the printed information device 10 (including the desirable regions of interest 14) may be printed on a suitable medium (see, e.g., reference numeral 16 in FIG. 4). Examples of suitable media include paper or another type of printing medium. The printed medium (including the printed information device 10) may be part of an object or package to be deployed. It is to be understood that the term "object" as used herein is to be interpreted broadly and may include, but is not limited to any type of object, product, document or package. Likewise, the term "package" is to be interpreted broadly herein to include any unit for containing a product, displaying a product, or otherwise identifying a branded good. Non-limitative examples of such packages include labels, anti-tamper strips (which tear when removal is attempted, thereby damaging both visual and electrical aspects of any deterrents), boxes, bags, containers, clamshells, bands, tape, wraps, ties, bottles, vials, dispensers, inserts, other documents, or the like, or combinations thereof.

The printed information device 10 may be generated, partitioned, encoded, and printed utilizing a system including means for performing each of the steps. In one non-limiting example, the system includes a computer or enterprise computing system and programs or software configured to i) generate an image using multiple hues, ii) partition the regions of interest 14 into channels, iii) encode the channels in a desirable manner, and iv) print the image. As used herein, the term "enterprise computing system" means a network of interconnected computers, including virtualized and/or redundant processors, banks of processors and/or servers, etc. It is to be understood that the components of the system may be implemented in a consolidated location, or portion(s) of the system may be implemented at different locations.

The hardware of such a system includes an electronic processing device, such as, for example, a controller, a micro controller, a microprocessor, a host processor, an application specific integrated circuit (ASIC), and/or a reprogrammable hardware logic device (such as a field programmable gate array (FPGA)). It is to be understood that the electronic processing device may be a processor working in conjunction with a central processing unit (CPU) performing the function of a general-purpose processor. The hardware may also include printer(s) and scanner(s).

Computer program(s) and/or software (e.g., computer readable code) may be loaded onto the computer or enterprise computing system, and stored in a memory thereof. Such programs and/or software are executable via the processing device. Examples of such programs(s) and/or software include those configured with algorithms to partition and encode all or a portion (e.g., regions of interest 14) of an image.

A specific non-limiting example of the multi-channel printed information device 10 including 6 total hues, and 2 hue and 6 hue data reading strategies/approaches is discussed hereinbelow. It is to be understood that this example is illustrative, and that any number of different hues may be incorporated into the printed information device 10 and different hue data reading strategies may be included in the channels of the region of interest 14. Each of the channels in this example includes different information encoded therein, which may be used to read the printed information device 10.

Figure 2:
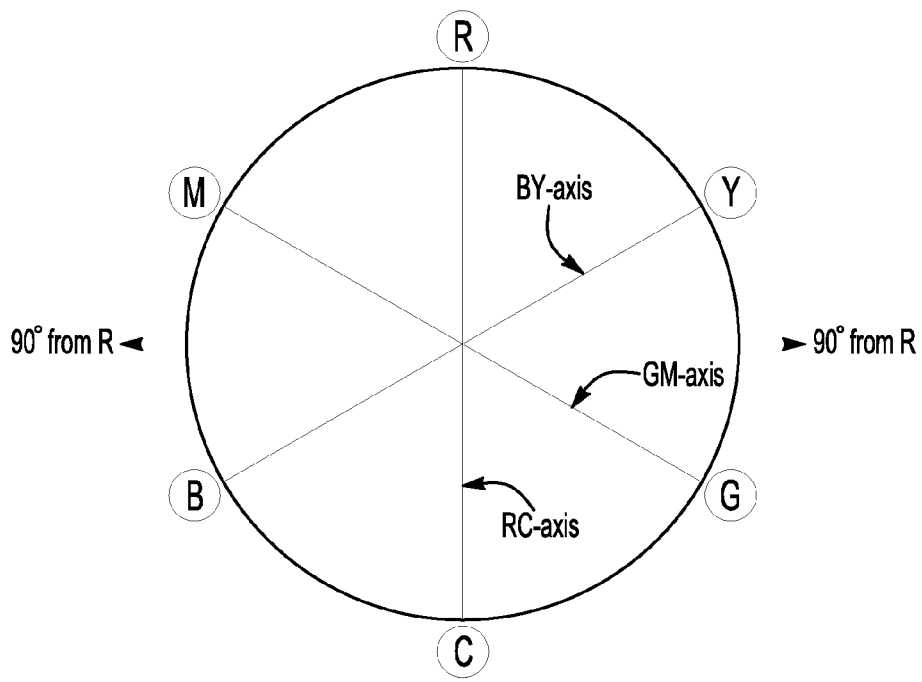
FIG. 2 is a diagram of a full saturation hue-based circular color space, according to a specific hue axis-based data-carrying process.
Figure 3:
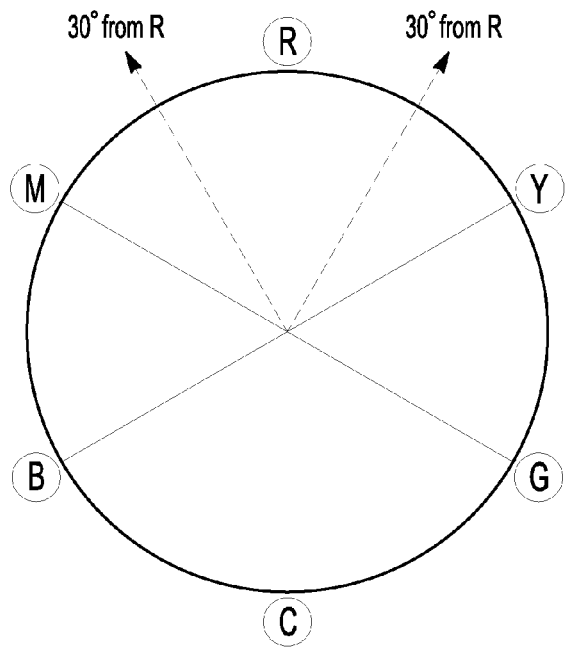
FIG. 3 is a diagram of a full saturation hue-based circular color space, according to a specific hue-based data-carrying process.

FIGS. 2 and 3 illustrate full saturation hue-based circular color spaces associated with the 2 and 6 hue data reading strategies, respectively. In each of the full saturation hue-based circular color spaces, the six total hues are mapped. Each circle is intersected by three equally spaced axes that divide the circle into six slices measuring sixty-degrees each. The primary additive hues, red (R), green (G), and blue (B), as well as their corresponding subtractive, or printing, hues, cyan (C), magenta (M), and yellow (Y), are mapped along such axes.

The printed information devices 10 are ultimately printed such that at least some of the regions of interest 14 are printed with one of the six hues shown, or, in another embodiment, with any of the hues represented by the circumference of the full saturation hue-based circular color space. For instance, the segment of the full saturation hue-based circular color space between red and magenta defines hues between these two hues, the segment of the saturation hue-based circular color space between magenta and blue defines hues between these two hues, and so on.

The 2 hue data reading strategy enables the region of interest 14 (and thus the printed information device 10) to be authenticated using any of the axes RC, BY, GM, shown in FIG. 2. The full saturation hue-based circular color space of FIG. 2 illustrates each primary additive color with its opposite and corresponding subtractive color. Thus, the axis RC pairs red with cyan, the axis GM pairs green with magenta, and the axis BY pairs blue with yellow. These pairs are known as hue- or color-opponency pairs.

Using this 2 hue data reading strategy approach, any of the hues may be read along one of the three opponency pair axes. As such, the color tiles of the printed information device 10 shown in FIG. 1 provide 3N possible signatures, where N=number of tiles, with a reduction in payload from 2.6 bits/tile to 1.0 bits/tile. The 2.6 bits is the result of ln(6)/ln(2) when all six hues are used for data reading (e.g., in the 6 hue data reading strategy), and the 1.0 bits is the result when the output hue is reported along a single axis alone (e.g., in the 2 hue data reading strategy), as shown in Table 1.

TABLE 1

Single Axis Multi-Hue Data Reading

| Tile Hue | Reported Value (BY-axis) | Reported Value (RC-axis) | Reported Value (GM-axis) |
|---|---|---|---|
| R | Y | R | M |
| G | Y | C | G |
| B | B | C | M |
| C | B | C | G |
| M | B | R | M |
| Y | Y | R | G |

If, for example, an R tile is being authenticated using the RC axis, then any hue read as M, Y, or R will be classified as R. In other words, any hue within 90° of R will be interpreted as R. As such, using any of the hue-opponency axes allows 90° error in hue. As such, the 2 hue data reading strategy associated with one channel of the region of interest 14 provides additional robustness to read-error through higher allowed hue error (i.e., the tolerance error is higher than, for example, a 6, 8, or 10 hue data reading strategy). This approach may be useful even where the reading device is not able to read the printed hue of the region of interest 14 with great precision. For instance, the reading device may actually detect the printed hue B as the hue M. However, because this hue M is nevertheless interpreted by the reading device using the axis RC, such that the hue R is returned, this reading is considered to be accurate within the tolerance of the salient reading strategy for the reading device. That is, the accuracy of the reading device output may not depend upon the particular hue returned by the reading device, but whether the returned hue is one of the two end hue of the correct axis in question. In this example, for instance, even if the reading device should have returned the hue C for the printed hue B when using the axis RC, because it returned the hue of the other end of the axis—the hue R—the reading is accurate within the tolerance of the strategy for the reading device.

For each region of interest 14 that is assigned a channel associated with the 2 hue data reading strategy, a reading strategy code may be generated which specifies a particular axis RC, BY, GM by which the region of interest 14 is to be interpreted. This reading strategy code may be encoded in the channel, thereby indicating to a reading device (see, e.g., reference numeral 18 in FIG. 4) which axis is to be used for data reading. For data reading, the reading device 18 reads the hue of each region of interest 14, and interprets the hue using the axis specified within the reading strategy code for that region of interest 14. The reading device 18 then reports the closest hue on the axis to the printed hue read for a region of interest 14 to a verification device (see, e.g., reference numeral 20 in FIG. 4). Alternatively, the reading device 18 may simply report the axis as a whole. The verification device 20 then compares the reported hue or axis for the given region of interest 14 with the expected axis as stored in a tolerance signature at the device 20. If the reported hue or the reported axis matches the expected axis, then the reading is considered to be accurate within the tolerance of the strategy for the reading device used.

The addition of the 2 hue data reading strategy to the region of interest 14 provides a 3-fold increase in hue error sensitivity for a 2.6-fold reduction in payload density when compared, for example, to the 6 hue data reading strategy. However, it may be desirable to include multiple approaches/strategies in a single readable area or printed information device 10 in order to provide multiple data streams, each of which is suitable for a different party in the supply chain (e.g., one for retailers and another for consumers).

The 6 hue data reading strategy enables the region of interest 14 (and thus the printed information device 10) to be authenticated using any of the hues R, C, B, Y, G, M shown in FIG. 3. If, for example, an R tile is being read, then any hue within 30° of R will be interpreted as R. As such, any error greater than 30° in hue results in a mis-assignment to at least a neighboring hue. This approach may be useful where the reading device 18 is able to read the printed hue of the region of interest 14 with great precision. Furthermore, because the error tolerance is so low with this approach, it may be desirable to also include error correcting code in this channel. For each region of interest 14 that is assigned a 6 hue data reading strategy, a reading strategy code may be generated which specifies one particular hue with which the region of interest 14 is to be associated with. This reading strategy code may be encoded in the channel, thereby indicating to the reading device 18 which hue is to be used for data reading. For data reading, the reading device 18 reads the hue of each region of interest 14, and then reports the closest hue within 30° of the read printed hue to a verification device 20. The verification device 20 then compares the reported hue for the given region of interest 14 with the expected hue as stored in a tolerance signature at the device 20. If the reported hue matches the expected hue, then the reading is considered to be accurate within the tolerance of the strategy for the reading device used.

Since the regions of interest 14 disclosed herein include at least two channels, each of which is associated with a different error tolerance, the region 14 may be read using two different strategies, as discussed herein. In the non-limiting example including channels associated with the 2 hue and 6 hue data reading strategies, high-error (i.e., low error tolerance), high error correcting code channels are coupled with low-error (i.e., high error tolerance), non-error correcting code channels. As alluded to above, such strategies may be suitable for a plurality of reading (e.g., scanning) devices 18 which themselves have different imaging capabilities (resolving power, actual bits of contrast, hue integrity/consistency). This provides some level of security irrespective of the presence of high-quality reading devices 18.

FIG. 4 illustrates a system 100 which is used to read the region of interest 14 and determine/verify whether the accuracy of the reading is within the tolerance of the reading device used. In some instances, the system 100 may also be used to authenticate the printed information device 10. Generally, the system 100 includes the previously mentioned reading device 18 and verification device 20. In general operation, the reading device 18 reads and interprets the one or more regions of interest 14 of the deterrents 10 printed on the printing medium 16. The reading device 18 passes the read information to the verification device 20. Based on the reading and interpretation of the region(s) of interest 14 by the reading device 18, the verification device 20 determines the accuracy of the reading, and in some instances, authenticates the printed information device 10.

The reading device 18 includes a reading mechanism 22, a communication mechanism 24, and a computer-readable medium 26. It is to be understood that the reading device 18 can include other components and mechanisms, in addition to and/or in lieu of the mechanisms 22, 24 and the medium 26. The reading device 18 may be part of or attached to a computing device, may be part of or attached to an image-formation device such as an inkjet or a laser printer, or may be a scanning device such as an optical scanner, digital camera, inspection camera, surveillance camera, and/or another type of device.

The reading mechanism 22 detects the region(s) of interest 14 of the printed information device 10 printed on the printing medium 16, and thus is that which can read and interpret the region(s) of interest 14. The reading mechanism 22 may be an optical reading or scanning mechanism, or another type of reading mechanism. In general, the reading mechanism 22 may be implemented in hardware, or in a combination of hardware and software. The regions of interest 14 have a number of different channels, and thus strategies, by which the printed information device 10 can be interpreted by a plurality of reading mechanisms 22 (one of which is shown in FIG. 4).

The communication mechanism 24 communicates data representing the region(s) of interest 14 as read and interpreted by the reading device 18 to the verification device 20.

The communication mechanism 24 also receives information from the verification device 20 that is indicative of whether the printed information device 10 has passed or failed error tolerance based on the information read and reported for the regions of interest 14. The communication mechanism 24 may be a wired and/or wireless network adapter mechanism for communicating with the verification device 20 via a wired and/or wireless network, or a direct wireless mechanism, such as a BLUETOOTH® mechanism, for direct wireless communication with the verification device 20. The communication mechanism 24 may alternatively be a direct wired mechanism, such as a serial port mechanism or a Universal Serial Bus (USB) mechanism, for direct wired communication with the verification device 20, or another type of communication mechanism. In general, the communication mechanism 24 may be implemented in hardware, or in a combination of hardware and software.

The computer-readable medium 26 may be a volatile and/or a non-volatile storage, such as semiconductor memory like dynamic random-access memory (DRAM), flash memory, a hard disk drive, or another type of tangible computer-readable medium.

The reading device 18 reads and interprets the regions of interest 14 in accordance with the data reading code encoded in such regions 14. In one embodiment, the reading mechanism reads 22 the region(s) of interest 14, and then the same or a different mechanism of the reading device 18 interprets the region(s) of interest 14 in accordance with the data reading code. Since the region(s) of interest 14 include two different channels, the reading device 18 used may be capable of performing one or both of the encoded data reading strategies. In some instances, the reading device 18 may be suitable for reading information in one of the channels, while another reading device (not shown in the Figure) may be suitable for reading information in another of the channels.

The verification device 20 includes a communication mechanism 28, an authentication mechanism 30, and a computer-readable medium 32. It is to be understood that the verification device 20 can include other components and mechanisms, in addition to and/or in lieu of the mechanisms 28, 30 and the medium 32. The verification device 20 may be a computing device, such as a server, a laptop, and/or a desktop computer, or another type of verification device.

The communication mechanism 28 receives data representing the region(s) of interest 14 as read and interpreted by the reading device 18. The communication mechanism 28 further sends information to the reading device 18 about whether the region of interest 14 has passed or failed error tolerance, based on the information reported by the reading device 18. As with the communication mechanism 22 of the reading device 18, the communication mechanism 28 of the verification device 20 may be a wired and/or wireless network adapter mechanism for communicating with the verification device 20 via a wired and/or wireless network, or a direct wireless mechanism, such as a BLUETOOTH® mechanism, for direct wireless communication. The communication mechanism 28 may alternatively be a direct wired mechanism, such as a serial port mechanism or a Universal Serial Bus (USB) mechanism, for direct wired communication with the verification device 20, or another type of communication mechanism. In general, the communication mechanism 28 may be implemented in hardware, or in a combination of hardware and software.

The computer-readable medium 32 may be a volatile and/or a non-volatile storage, such as semiconductor memory like dynamic random-access memory (DRAM), flash memory, a hard disk drive, or another type of tangible computer-readable medium. The computer-readable medium 32 stores data representing a tolerance signature of the region(s) of interest 14. In some instances, the computer-readable medium 26 of the reading device 18 may store the tolerance signature as an encrypted string. In such instances, the verification device 20 may not be used to determine whether the reading is within the error tolerance of the reading device 18. Regardless of where it is stored, the tolerance signature specifies the expected reading strategy (and associated tolerance level) by which the reading device 18 is to read and interpret the regions of interest 14 and also specifies the outcomes when such strategy is applied.

As such, the tolerance signature may be different than the data reading code encoded in the region of interest 14. The data reading code is the actual manner by which the reading device 18 reads and interprets the corresponding region of interest 14, whereas the tolerance signature is the expected manner by which the reading device 18 is to read and interpret the regions 14 and the expected results of such reading and interpretation. Where the code is wrong (i.e., not in accordance with the tolerance signature) or verifiably a repeat of another code, it is determined that the associated printed information device 10 is counterfeit.

To further illustrate embodiment(s) of the present disclosure, the following example is given herein. It is to be understood that this example is provided for illustrative purposes and is not to be construed as limiting the scope of the disclosed embodiment(s).

EXAMPLE

Deterrents were generated including two channels, one of which was encoded for a 2 hue data reading strategy, and the other of which was encoded for a 6 hue data reading strategy. The 2 hue data reading strategy has a substantial insensitivity to hue error, which results in increased accuracy, within the tolerance of the reading strategy for a particular reading device, for smaller tiles (where X2, shown below, denotes the size of the tile at 100% accuracy). The security payload density (SPD) at full authentication (fA) for a piecewise linear (PL) fit is designated SPD-fA-PL, and generally corresponds to 99.9% tile accuracy. The values for X2 and the corresponding SPD-fA-PL in bytes/in$^2$ were tested using a Hewlett Packard HP 6280 thermal inkjet all-in-one for printing and scanning.

The deterrents underwent a variety of conditions (which are further described in Simske et al., "*Effect of Copying and Restoration on Color Barcode Payload Density*", Published at DocEng '09 (September 2009)), including spectral pre-compensation or not; using saturation equalization [SE] image restoration or not; and using distance in RGB space [RGB] or nearest-Hue [Hue] authentication algorithms. The error tolerance for the 6 hue data reading strategy is designated "err", indicating that the error tolerance is smaller and is greater than or equal to 30°, and the error tolerance for the 2 hue data reading strategy is designated "E", indicating that the error tolerance is larger and is greater than or equal to 90°.

For the channel associated with the 6 hue data reading strategy, $$SPD\text{-}fA\text{-}PL = \frac{\ln(6)}{\ln(2)} \cdot \frac{PI}{(PI+NPI)} \cdot \frac{byte}{bits} \cdot \frac{DPI^2}{X2^2}$$

$$= 2.5849625^*(56/(56+8))^*(1/8)^*600^2/(X2)^2$$

$$= 101782.9/(X2)^2$$

For the channel associated with the 2 hue data reading strategy, $$SPD\text{-}fA\text{-}PL = \frac{PI}{(PI+NPI)} \cdot \frac{byte}{bits} \cdot \frac{DPI^2}{X2^2}$$

$$= (56/(56+8))^*(1/8)^*600^2/(X2)^2$$

$$= 39375/(X2)^2$$

Table 2 shows the X2 values for the original prints and after 1 or 2 copies were made. Table 3 shows the SPD-fA-PL for the original prints and after 1 or 2 copies were made.

TABLE 2

X2 values (pixels at 600 × 600 dpi resolution), 99.9% per-tile accuracy

| CONDITION | No Spectral Pre-Compensation | | | | Spectral Pre-Compensation | | | |
|---|---|---|---|---|---|---|---|---|
| | RGB-no | RGBSE | Hue-no | Hue-SE | RGB-no | RGB-SE | Hue-no | Hue-SE |
| Original, (6 hue data reading strategy = err) | 10.0 | 10.0 | 9.2 | 9.6 | 8.0 | 7.5 | 7.3 | 7.3 |
| Original, (2 hue data reading strategy = E) | 5.6 | 6.4 | 5.5 | 6.6 | 5.9 | 7.3 | 4.0 | 7.3 |
| Copy 1, (6 hue data reading strategy = err) | 16.8 | 17.2 | 12.9 | 13.9 | 13.0 | 12.1 | 10.0 | 10.0 |
| Copy 1, (2 hue data reading strategy = E) | 8.8 | 7.9 | 8.2 | 7.3 | 8.1 | 8.9 | 6.9 | 9.1 |
| Copy 2, (6 hue data reading strategy = err) | 28.3 | 26.5 | 22.7 | 23.0 | 17.4 | 18.4 | 13.2 | 14.3 |
| Copy 2, (2 hue data reading strategy = E) | 12.2 | 11.0 | 10.8 | 10.4 | 12.0 | 10.9 | 9.2 | 10.3 |

TABLE 3

SPD-fA-PL values (bytes/in$^2$), 99.9% per-tile accuracy

| CONDITION | No Spectral Pre-Compensation | | | | Spectral Pre-Compensation | | | |
|---|---|---|---|---|---|---|---|---|
| | RGB-no | RGBSE | Hue-no | Hue-SE | RGB-no | RGB-SE | Hue-no | Hue-SE |
| Original, (6 hue data reading strategy = err) | 1020 | 1020 | 1200 | 1100 | 1590 | 1810 | 1910 | 1910 |
| Original, (2 hue data | 1260 | 960 | 1300 | 900 | 1130 | 740 | 2460 | 740 |

TABLE 3-continued

SPD-fA-PL values (bytes/in$^2$), 99.9% per-tile accuracy

| CONDITION | No Spectral Pre-Compensation | | | | Spectral Pre-Compensation | | | |
|---|---|---|---|---|---|---|---|---|
| | RGB-no | RGBSE | Hue-no | Hue-SE | RGB-no | RGB-SE | Hue-no | Hue-SE |
| reading strategy = E) Copy 1, (6 hue data reading strategy = err) | 360 | 340 | 610 | 530 | 600 | 700 | 1020 | 1020 |
| Copy 1, (2 hue data reading strategy = E) | 510 | 630 | 590 | 740 | 600 | 500 | 830 | 480 |
| Copy 2, (6 hue data reading strategy = err) | 130 | 140 | 200 | 190 | 340 | 300 | 580 | 500 |
| Copy 2 (2 hue data reading strategy = E) | 260 | 330 | 340 | 360 | 270 | 330 | 470 | 370 |

The results indicate that the channels having different error tolerances associated therewith result in different spectral densities, depending, at least in part, on the conditions to which the regions of interest 14 incorporating such channels undergo. In particular, spectral pre-compensation methods may be more desirable for regions of interest 14 that are printed under controlled printing, scanning, etc., and when the smaller error tolerance is present (e.g., 6 hue data reading strategy is used). In sharp contrast, it may be more desirable to skip the spectral pre-compensation methods when printing is being outsourced, and a larger error tolerance is present (e.g., 2 hue data reading strategy is used). Furthermore, the results indicate that generally, a higher spectral density is obtained along the single hue axis when no spectral pre-compensation methods are incorporated. This is particularly surprising because these channels have smaller bits (e.g., 1.0 bits as opposed to 2.6 bits).

From this example, it should be noted that discrepancies in X2 may be accounted for. Suppose for the following conditions (spectral pre-compensation, hue authentication, and no SE restoration) there is an inspection system (reading device 18) capable of resolving to the equivalent of 5 pixels at 600× 600 dpi resolution. In this instance, the error tolerance for the 2 hue data reading strategy would be E=0.0%, since 5 pixels is greater than the X2=4.0. However, the small error tolerance err is >0.0%. In this instance, to have an error-free hue data reading strategy, additional error-correcting code is included in order to render the reading of this channel more robust.

While several embodiments have been described in detail, it will be apparent to those skilled in the art that the disclosed embodiments may be modified. Therefore, the foregoing description is to be considered exemplary rather than limiting.

What is claimed is:

1. An object including a printed information device, comprising:
   a printing medium; and
   the printed information device printed on the printing medium, the printed information device including:
   a non-natural image of pre-selected color tiles;
   a region of interest of the image, the region of interest representing a physical area of the image;
   at least two channels assigned in the region of interest by different means of logical partitioning, each of the at least two channels having different error tolerances and being associated with a distinct hue data reading strategy, each of the distinct hue data reading strategies including a hue-opponency pair axis by which a hue of the region of interest is to be interpreted, wherein each error tolerance is a degree of deviation from the hue-opponency pair axis that is allowed to occur during reading of a corresponding one of the at least two channels; and
   at least one of continuous or cyclic hue information independently encoded in each of the at least two channels, the hue information based on and corresponding with the hue distinct data reading strategy for each of the at least two channels;
   wherein the printed information device is configured to be read substantially simultaneously by the at least two distinct hue data reading strategies.

2. The object as defined in claim 1 wherein one of the at least two channels corresponds with a 2 hue data reading strategy having the hue-opponency pair axis selected from the group consisting of Red-Cyan, Blue-Yellow, and Green-Magenta and the error tolerance greater than or equal to 90°, and wherein an other of the at least two channels corresponds with a 6 hue data reading strategy having three hue-opponency pair axes including Red-Cyan, Blue-Yellow, and Green-Magenta and the error tolerance greater than or equal to 30°.

3. The object as defined in claim 1 wherein the region of interest is at least one of the color tiles.

4. The object as defined in claim 1 wherein the region of interest has a security payload density that is higher for one of the at least two channels after at least one copy cycle.

5. The object as defined in claim 4 wherein after the at least one copy cycle, the security payload density is higher for i) the one of the at least two channels that is associated with a 2 hue data reading strategy and has not undergone spectral pre-compensation, or ii) the one of the at least two channels that is associated with a 6 hue data reading strategy and has undergone spectral pre-compensation.

6. The object as defined in claim 1 wherein the printed information device further includes error correcting code encoded in at least one of the at least two channels, the error correcting code depending upon a corresponding one of the at least two distinct reading strategies.

7. The object as defined in claim 6 wherein the error correcting code is targeted for a first of the at least two channels, and a second of the at least two channels is automatically readable as a result.

8. The object as defined in claim 1 wherein the continuous or cyclic hue information is a respective reading strategy code encoded in each of the at least two channels, each of the respective reading strategy codes specifying the hue-opponency pair axis.

9. The object as defined in claim 1 wherein:
   8 total hues are used for the pre-selected color tiles;
   one of the at least two channels corresponds with a 2 hue data reading strategy having the error tolerance greater than or equal to 67.5°; and
   an other of the at least two channels corresponds with an 8 hue data reading strategy having the error tolerance greater than or equal to 22.5°.

10. The object as defined in claim 1 wherein:

10 total hues are used for the pre-selected color tiles;

one of the at least two channels corresponds with a 2 hue data reading strategy having the error tolerance greater than or equal to 54°; and an other of the at least two channels corresponds with a 10 hue data reading strategy having the error tolerance greater than or equal to 18°.

11. An object including a printed information device, comprising:

a printing medium; and the printed information device printed on the printing medium, the printed information device including:

a plurality of color tiles, at least some of which contain payload indicia;

at least two channels assigned to at least one of the color tiles containing payload indicia, one of the at least two channels having a 30° or greater error tolerance, and an other of the at least two channels having a 90° or greater error tolerance; and at least one of continuous or cyclic information independently encoded in each of the at least two channels, the information encoded in the one of the at least two channels being a first data reading strategy, and the information encoded in the other of the at least two channels being a second data reading strategy that is different than the first data reading strategy, wherein the first and second data reading strategies are configured to be read by different reading devices.

12. The object as defined in claim 11 wherein after at least one copy cycle, a security payload density is higher for i) the channel having the 90° or greater error tolerance and that has not undergone spectral pre-compensation, or ii) the channel having a 30° or greater error tolerance and that has undergone spectral pre-compensation.

13. A method for generating a printed information device, comprising:

selecting a plurality of color tiles to form an image;

partitioning a physical area of the image into at least two channels based on error tolerance such that each of the at least two channels has a different error tolerance and is associated with a distinct hue data reading strategy which includes a hue-opponency pair axis by which a hue of the physical area is to be interpreted and wherein each error tolerance is a degree of deviation from the hue-opponency pair axis that is allowed to occur during reading of a corresponding one of the at least two channels; and independently encoding each of the at least two channels with at least one of continuous or cyclic hue information based on and corresponding with the distinct hue data reading strategy for each of the at least two channels, thereby forming an encoded region of interest in the image that includes the at least two distinct hue data reading strategies.

14. The method as defined in claim 13, further comprising printing the encoded region of interest.

15. The method as defined in claim 13, further comprising associating each of the at least two channels with a number of events that is equal to or greater than 6.

16. The method as defined in claim 13 wherein the distinct hue data reading strategy of one of the at least two channels is a 2 hue data reading strategy having the hue-opponency pair axis selected from the group consisting of Red-Cyan, Blue-Yellow, and Green-Magenta and the error tolerance greater than or equal to 90°, and the distinct hue data reading strategy of an other of the at least two channels is a 6 hue data reading strategy having three hue-opponency pair axes including Red-Cyan, Blue-Yellow, and Green-Magenta and the error tolerance greater than or equal to 30°.

17. The method as defined in claim 13, further comprising selecting the physical area from at least one of the color tiles.

18. A method for generating a printed information device, comprising:

partitioning a physical area of an image into at least two channels based on error tolerance;

performing spectral pre-compensation on the physical area of the image; and independently encoding each of the at least two channels with at least one of continuous or cyclic information, thereby forming an encoded region of interest in the image that includes at least two distinct reading strategies.

19. A method for generating a printed information device, comprising:

partitioning a physical area of an image into at least two channels based on error tolerance;

independently encoding each of the at least two channels with at least one of continuous or cyclic information, thereby forming an encoded region of interest in the image that includes at least two distinct reading strategies;

associating each of the at least two channels with a number of events that is equal to or greater than 2; and selecting the events from the group consisting of hues, shapes, or orientations.

\* \* \* \* \*